United States Patent
Neill et al.

(10) Patent No.: US 10,065,404 B2
(45) Date of Patent: Sep. 4, 2018

(54) IN-LINE LAMINATION OF HEAVY-GAUGE POLYMER SHEET WITH A PRE-FORMED POLYMER FILM

(75) Inventors: Ryan Thomas Neill, Kingsport, TN (US); Patsy Jeanine Barton, Church Hill, TN (US); Jill Ellen Cline, Gray, TN (US); James Hubert David, Kingsport, TN (US); David Gayle Salyer, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 13/194,220

(22) Filed: Jul. 29, 2011

(65) Prior Publication Data

US 2013/0025774 A1  Jan. 31, 2013

(51) Int. Cl.
| | | |
|---|---|---|
| *B29C 47/02* | (2006.01) | |
| *B32B 37/15* | (2006.01) | |
| *B29C 47/00* | (2006.01) | |

(52) U.S. Cl.
CPC ........ *B32B 37/153* (2013.01); *B29C 47/0021* (2013.01); *B29C 47/0064* (2013.01); *B32B 2307/412* (2013.01); *B32B 2309/02* (2013.01); *B32B 2309/105* (2013.01); *B32B 2309/12* (2013.01)

(58) Field of Classification Search
CPC ............ B29C 47/0021; B29C 47/0064; B32B 2307/412; B32B 2309/02; B32B 2309/105; B32B 2309/12; B32B 37/153
USPC ........................................................ 156/242
See application file for complete search history.

(56) References Cited

U.S. PATENT DOCUMENTS

| | | | | |
|---|---|---|---|---|
| 3,326,735 A | * | 6/1967 | Beason, Jr. ................. | 156/273.7 |
| 3,717,425 A | * | 2/1973 | North et al. .................... | 425/71 |
| 3,798,103 A | * | 3/1974 | Gaunt ...................... | B05D 7/02 |
| | | | | 156/244.24 |
| 3,904,806 A | * | 9/1975 | Waggoner ..................... | 428/511 |
| 3,917,787 A | * | 11/1975 | Hansen ......................... | 264/146 |
| 3,946,871 A | * | 3/1976 | Sturm ......................... | 220/359.2 |
| 3,979,491 A | * | 9/1976 | Zavasnik ............ | B29C 49/0073 |
| | | | | 264/520 |
| 4,076,570 A | * | 2/1978 | Medley et al. .......... | 156/244.11 |

(Continued)

FOREIGN PATENT DOCUMENTS

| | | | |
|---|---|---|---|
| DE | 2730899 A | * | 2/1979 |
| DE | 102 36 045 A1 | | 2/2004 |

(Continued)

OTHER PUBLICATIONS

ASTM D 903.

(Continued)

*Primary Examiner* — Philip Tucker
*Assistant Examiner* — Vicki Wu
(74) *Attorney, Agent, or Firm* — Tammye L. Taylor (57) ABSTRACT

A process for in-line laminating a heavy-gauge transparent polymer sheet with a pre-pre-formed polymer film to produce a laminated polymer sheet. The pre-formed polymer film can impart one or more aesthetic or functional elements to the heavy-gauge polymer sheet. The resulting laminate can have equivalent, or enhanced, properties as compared to conventionally-prepared laminates and can be formed into a variety of articles with multiple end uses.

36 Claims, 5 Drawing Sheets

(56) References Cited

U.S. PATENT DOCUMENTS

| | | | |
|---|---|---|---|
| 4,124,346 A * | 11/1978 | Greenwood et al. | 425/188 |
| 4,289,559 A * | 9/1981 | Murphy | 156/238 |
| 4,711,933 A * | 12/1987 | McCready et al. | 525/415 |
| 5,006,604 A * | 4/1991 | Romance | 525/173 |
| 5,069,851 A * | 12/1991 | Hicks et al. | 264/171.13 |
| 5,643,666 A | 7/1997 | Eckart et al. | |
| 5,707,478 A * | 1/1998 | Fujii et al. | 156/324 |
| 5,806,970 A * | 9/1998 | Giorgianni | H04N 5/64 312/7.2 |
| 5,894,048 A | 4/1999 | Eckart et al. | |
| 5,958,539 A | 9/1999 | Eckart et al. | |
| 5,998,028 A | 12/1999 | Eckart et al. | |
| 6,025,069 A * | 2/2000 | Eckart et al. | 428/339 |
| 6,136,490 A * | 10/2000 | Ogawa | G03G 9/09392 430/109.3 |
| 6,180,749 B1 * | 1/2001 | Kim et al. | 528/272 |
| 6,372,164 B1 * | 4/2002 | Bennett | B05D 5/06 156/244.27 |
| 6,372,324 B1 * | 4/2002 | Fujii et al. | 428/141 |
| 6,406,285 B1 * | 6/2002 | Nissel | 425/141 |
| 6,896,966 B2 | 5/2005 | Crawford et al. | |
| 7,081,300 B2 | 7/2006 | Laurence et al. | |
| 7,303,793 B2 * | 12/2007 | Smillie | 428/31 |
| 2002/0160680 A1 * | 10/2002 | Laurence et al. | 442/394 |
| 2003/0003282 A1 | 1/2003 | Roys et al. | |
| 2003/0152696 A1 * | 8/2003 | Nissinen et al. | 427/223 |
| 2003/0188823 A1 * | 10/2003 | Westbrook et al. | 156/242 |
| 2003/0212178 A1 * | 11/2003 | Eustace et al. | 524/430 |
| 2004/0154734 A1 | 8/2004 | Akada et al. | |
| 2004/0164434 A1 * | 8/2004 | Tabar | B29C 47/0021 264/1.6 |
| 2004/0191438 A1 * | 9/2004 | Cosentino | B32B 5/02 428/34.3 |
| 2005/0241759 A1 * | 11/2005 | Goodson et al. | 156/308.2 |
| 2005/0256270 A1 * | 11/2005 | Weeks | 525/240 |
| 2006/0019099 A1 * | 1/2006 | Wang et al. | 428/412 |
| 2006/0151096 A1 * | 7/2006 | Bentmar et al. | 156/244.11 |
| 2007/0057400 A1 * | 3/2007 | Kung | C08G 64/307 264/141 |
| 2007/0172636 A1 | 7/2007 | Smith et al. | |
| 2007/0177262 A1 * | 8/2007 | Maekawa | G03B 21/625 359/457 |
| 2008/0045101 A1 * | 2/2008 | Near et al. | 442/35 |
| 2008/0299354 A1 | 12/2008 | Zydonik | |
| 2009/0011213 A1 * | 1/2009 | Tripathi | 428/293.4 |
| 2010/0203346 A1 * | 8/2010 | Grimes | B29C 47/004 428/474.4 |

FOREIGN PATENT DOCUMENTS

| | | |
|---|---|---|
| EP | 0 144 642 A2 | 6/1985 |
| EP | 0 461 273 A1 | 12/1991 |
| EP | 0 618 071 A1 | 10/1994 |
| EP | 959020 A1 * | 11/1999 |
| EP | 1 043 147 A1 | 10/2000 |
| JP | 56 025719 A | 3/1981 |
| JP | 56025719 A * | 3/1981 |
| JP | 88012771 B * | 3/1988 |
| JP | 10 284875 | 10/1998 |
| JP | 2009078359 A * | 4/2009 |
| JP | 2009144019 A * | 7/2009 |
| WO | WO 99/32284 A1 | 7/1999 |
| WO | WO 0126984 A1 * | 4/2001 |
| WO | WO 02/08317 A1 | 1/2012 |

OTHER PUBLICATIONS

ASTM G 154 Cycle 1.
ASTM D 1003.
ASTM D 3418.
ASTM D 2244.
Notification of Transmittal of the International Search Report and the Written Opinion of the International Searching Authority, or the Declaration: International Application No. PCT/US2012/046360, Feb. 14, 2013.

* cited by examiner

IN-LINE LAMINATION OF HEAVY-GAUGE POLYMER SHEET WITH A PRE-FORMED POLYMER FILM

FIELD OF THE INVENTION

This invention relates to processes and systems for aesthetically and/or functionally modifying heavy-gauge polymer sheets.

BACKGROUND

Heavy-gauge polymer sheets are used in a variety of applications, including interior finishes for new and renovation construction, product displays and packaging, as well as various types of signage. Several techniques exist for decorating and/or functionally modifying polymer sheets. For example, additives like color concentrates or UV stabilizers can be added to the polymer melt prior to its extrusion or one or more colors can be painted, printed, or sprayed onto the final polymer sheet. Other modification techniques, such as embossing, can be carried out with specialized rollers immediately after extrusion as the polymeric extrudate cools and hardens. In addition, a decorative or functional (e.g., abrasion-resistant) film may be batch-laminated or secured with an adhesive onto the base polymer sheet after it is cooled and has been removed from the extrusion line.

Processes and systems for decorating or otherwise modifying a heavy-gauge polymer sheet often require extended cycle times, specialized equipment, and/or expensive additives and materials. As a result, these processes are often cost-prohibitive and capital-intensive, especially for small- or intermediate-scale production volumes. Long extrusion transition times between on-specification products and limited recyclability of trim scrap are common. These drawbacks not only result in higher volumes of waste materials, but also increase the amount of "dead" time within a production cycle, thereby minimizing overall productivity and maximizing cost. Specialized equipment required for processes like embossing can be expensive and is often time-consuming to change out between production runs. Some additives, such as UV stabilizers, have a high per-unit cost, which increases the overall operating expense when the additive are bulk loaded into, rather than applied onto, the polymer base sheet. Other additives, including many fragrances, are heat-sensitive and will degrade during production, which limits the processing flexibility of most conventional processes.

Thus, a need exists for an efficient, flexible process for consistently producing high-quality aesthetically- and/or functionally-modified heavy-gauge polymer sheets. The process and related systems would preferably minimize both capital and operating costs, while reducing the volume of waste produced and optimizing the cycle and transition times to thereby maximize process throughput and overall profitability.

SUMMARY OF THE INVENTION

One embodiment of the present invention concerns a process for producing a laminated sheet. The process comprises a step of extruding a first polymeric material into a heavy-gauge transparent polymer sheet. The heavy-gauge transparent polymer sheet has an average thickness of at least 40 mils and a haze of less than 15 percent. The process further comprises a step of in-line laminating a pre-formed polymer film formed from a second polymeric material onto the heavy-gauge transparent polymer sheet to thereby provide a laminated polymer sheet.

Another embodiment of the present invention concerns a process for producing a laminated sheet. The process comprises a step of extruding a first polymeric material into a heavy-gauge polymer sheet having an average thickness of at least 40 mils. The first polymeric material is selected from the group consisting of copolyesters, polycarbonates, and acrylics. The process further comprises a step of in-line laminating a pre-formed polymeric film made from a second polymeric material onto the heavy-gauge polymer sheet to thereby provide a laminated polymer sheet.

Yet another embodiment of the present invention concerns a process for producing a laminated polymer sheet. The process comprises a step of extruding a first polymeric material into a heavy-gauge transparent sheet having an average thickness of at least 40 mils and a light transmission of at least 80 percent. The process also comprises a step of passing the heavy-gauge transparent sheet through a nip defined between a first and a second roller and a step of co-feeding a pre-formed polymer film formed of a second polymeric material to the nip. The co-feeding step includes contacting a contact surface of the pre-formed polymer film with a contact surface of the heavy-gauge transparent sheet to thereby form a laminated polymer sheet.

BRIEF DESCRIPTION OF THE DRAWINGS

Various embodiments of the present invention are described in detail below with reference to the attached drawing figures, wherein.

DETAILED DESCRIPTION

Processes and systems configured according to various embodiments of the present invention can be useful for aesthetically- and/or functionally-modifying a heavy-gauge polymer sheet. According to one embodiment, a pre-formed polymer modifying film can be in-line laminated onto a heavy-gauge polymer base sheet to thereby provide a decorated or otherwise modified polymer laminate. The resulting laminated sheet can be utilized for a variety of end uses, which will be discussed in further detail below. The processes or systems for producing a polymeric laminate, as described herein, can exhibit several commercial advantages including, for example, minimization of capital and/or operating costs, enhanced product quality, reduced cycle time, optimized inventory volumes, reduction of process waste, and/or increase in process efficiency and flexibility as compared to conventional processes for decorating a heavy-gauge polymer sheet. Additional advantages and benefits may become apparent as embodiments of the present invention are described in detail below.

Processes and systems configured according to embodiments of the present invention can be utilized to decorate or otherwise functionally-modify a heavy-gauge sheet made from a polymer material. As used herein, the term "polymer" refers to any material comprising molecules that include one or more repeating monomer units. Polymers can be natural or synthetic, and can include plastic or thermoplastic materials. Polymers useful in embodiments of the present invention can comprise a homopolymer formed via polymerization of a single monomer or a copolymer formed from the co-polymerization of two or more different monomers. In one embodiment of the present invention, polymers used herein can comprise linear polymers, cross-linked polymers, block polymers, grafted polymers, branched polymers, and combinations thereof. In one embodiment, the polymers useful in the invention can comprise from 0 to 10 weight percent (wt %), for example, from 0.01 to 5 weight percent, from 0.01 to 1 weight percent, from 0.05 to 5 weight percent, from 0.05 to 1 weight percent, or from 0.1 to 0.7 weight percent, based on the total weight of the polymer, respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polymer. The branching agents may be used either to branch a polymer or mixture of polymers. In one embodiment, the polymeric materials utilized herein can exclude any paper or foil materials.

The heavy-gauge polymer sheet being laminated can be formed of any suitable type of polymeric material, including aromatic polymers, aliphatic polymers, and combinations thereof. Examples of polymeric materials suitable for use in forming the heavy-gauge polymer sheet can include, but are not limited to, both polyesters and copolyesters such as polyethylene terephthalate (PET), polybutylene terephthalate (PBT), poly(trimethylene)terephthalate (PTT), glycol-modified polyethylene terephthalate (PETG), acid-modified polyethylene terephthalate (PETA), poly(cyclohexylenedimethylene terephthalate) (PCT), acid-modified poly(cyclohexylenedimethylene terephthalate) (PCTA), glycol-modified poly(cyclohexylenedimethylene terephthalate) (PCTG), and amorphous polyethylene terephthalate (APET); polyvinyl chloride (PVC); polycarbonate (PC); polymethyl methacrylate (PMMA); impact modified acrylic (IMA); polymethyl methacrylimide (PMMI); styrene-acrylic copolymers (SMMA); styrene-butadiene copolymers and block copolymers (SBS and SBCS); styrene-acrylonitrile copolymers (SAN), acrylonitrile-styrene-acrylate copolymers (ASA); polystyrene (PS); high-impact polystyrene (HIPS); ionomers such as SURLYN™ (commercially available from Du Pont); amorphous nylons such as amorphous polyamide (PA); transparent acrylonitrile-butadiene-styrene copolymer (TABS); polyimide (PI); polyetherimide (PEI); polyethersulfone (PES); polyetheretherketone (PEEK); polysulfone (PSU); polyphenylsulphone (PPSU); clarified polypropylene (PP); polyethylenes such as high density polyethylene (HDPE), low density polyethylene (LDPE), linear low density polyethylene (LLDPE), ethylene vinyl acetate (EVA), ethylene methylacrylate (EMA), ethylene methylacrylate copolymer (EMAC), and ethylene butyl acrylate copolymer (EBAC); cyclic polyolefins such as cycloolefin polymer (COP) and cycloolefin copolymer (COC); thermoplastic urethane (TPU); cellulosics such as cellulose acetate (CA), cellulose acetate butyrate (CAB), and cellulose acetate propionate (CAP); allyl diglycol carbonate (ADC); polyarylate such as U-100 (commercially available from Unitika, Ltd.); polyester ether (TPE); poly lactic acid (PLA); ethylene tetrafluoroethylene (ETFE); fluorinated ethylene propylene (FEP); perfluoroalkoxy (PFA); polyethylene vinyl alcohol copolymers (EVOH); fluorinated polyolefins (PTFE); biaxially-oriented polymers such as boPET and boPP; polyols; and alloys, blends, and/or mixtures thereof. In one embodiment, the polymeric material used to form the heavy-gauge polymer sheet can be selected from the group consisting of copolyesters, polycarbonates, acrylics, and combinations thereof.

In one embodiment, the polymer sheet being laminated can be a heavy-gauge polymer sheet having a thickness of at least about 40 mils, at least about 60 mils, or at least about 80 mils and/or not more than about 1 inch, not more than about 0.75 inches, or not more than about 0.5 inches. The heavy-gauge sheet can also be a transparent polymer sheet such that the sheet can has an average light transmission (ASTM D 1003) of at least about 80 percent, at least about 85 percent, or at least about 90 percent. In another embodiment, the heavy-gauge transparent polymer sheet can have a haze (ASTM D 1003) of less than 15 percent, less than 10 percent, less than 5 percent, or less than 1 percent.

Figures 1, 3:
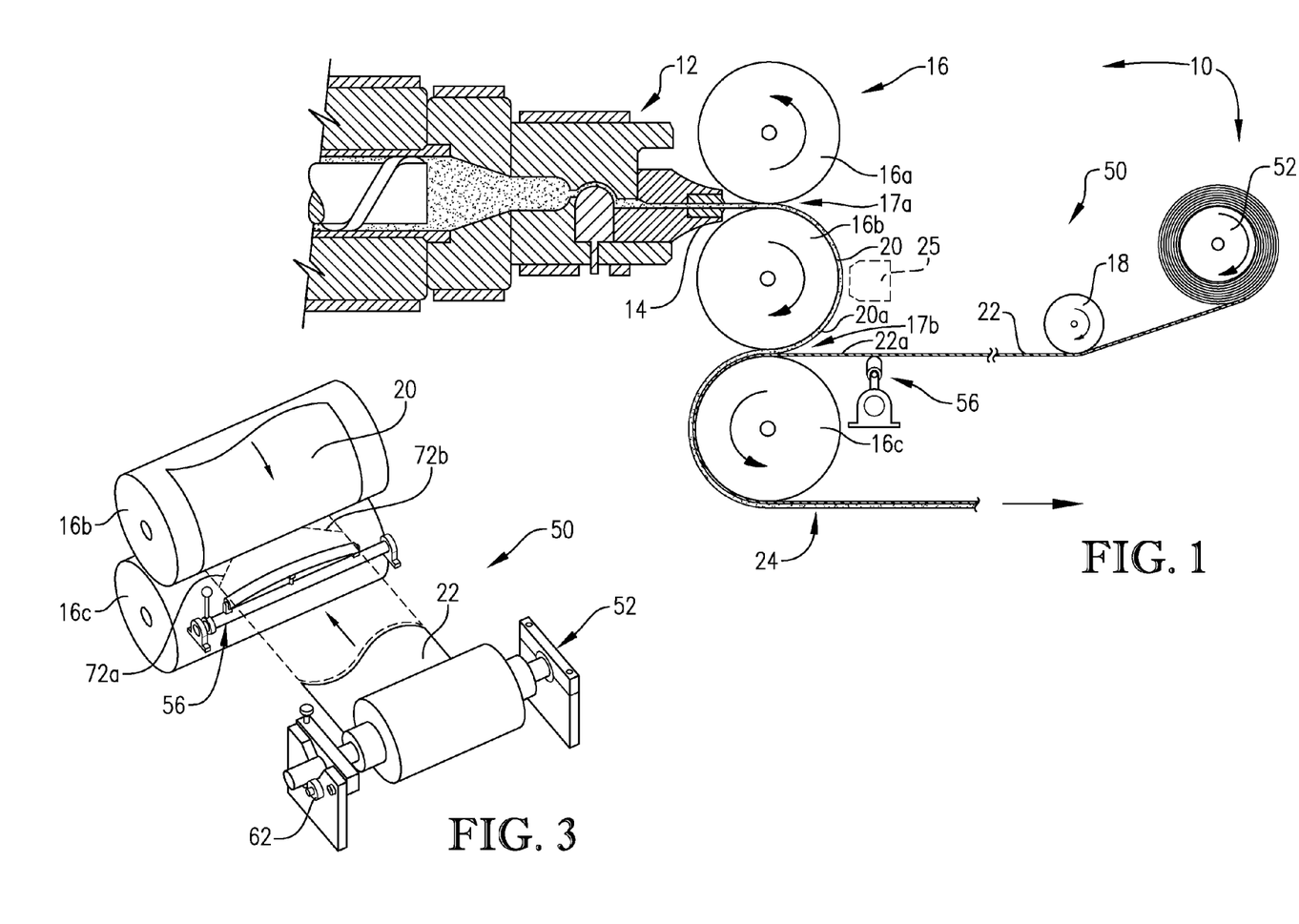
FIG. 1 is a partial schematic side view of an extrusion system configured according to one embodiment of the present invention, particularly illustrating the in-line lamination of a heavy-gauge polymer sheet with a pre-formed film.
FIG. 3 an isometric view of the in-line lamination zone employed by the extrusion system illustrated in FIG. 1, particularly illustrating several methods of ensuring the pre-formed film is appropriately co-fed into the nip defined between two cooling rollers.

Turning now to FIG. 1, a partial view of an extrusion system (e.g., an extrusion line) 10 for producing a heavy-gauge polymer sheet according to one embodiment of the present invention is provided. Extrusion system 10 includes a melt extruder (not shown in FIG. 1) for heating a plurality of polymer pellets into a polymer melt, which can then be sequentially passed through a melt pump and a optional static mixer (not shown in FIG. 1) before entering an extrusion die 12, as shown in FIG. 1. The polymeric extrudate discharged from die head 14 can then pass into a first nip 17a defined between a top roller 16a and middle roller 16b of a cooling roller stack 16. Although shown in FIG. 1 as comprising three rollers, it should be understood that cooling roller stack 16 can include any suitable number of rollers. For example, cooling roller stack 16 can include at least one, at least two, or at least three rollers and/or not more than six, not more than five, or not more than four rollers. Further, although illustrated as being arranged in a downstack configuration (such that the polymer melt moves downwardly through cooling roller stack 16), it should also be understood that cooling roller stack 16 can also be arranged in an upstack configuration (such that the polymer melt moves upwardly through cooling roller stack 16). In addition, rollers 16a-c can be arranged in a fixed stack (such that none of the rollers 16a-c is movable from a static position) or in an adjustable stack (such that at least one of cooling rollers 16a-c is movable from one position to another).

As shown in FIG. 1, the polymer melt exiting first nip 17a can then pass over the back side of middle roller 16b before entering a second nip 17b defined between middle and bottom rollers 16b and 16c. The polymer sheet exiting second nip 17b can then pass over the front side of bottom roller 16c before being routed to a trim knife or product sheet roller (not shown in FIG. 1) to be cut and packaged or rolled as a final laminate product exiting extrusion system 10.

In one embodiment of the present invention depicted in FIG. 1, the heavy-gauge polymer sheet produced in extrusion system 10 can be in-line laminated with a polymer modifying film to thereby produce an aesthetically- or functionally-modified polymer laminate. As used herein, the term "in-line lamination" refers to lamination of a polymer base sheet carried out at some point along the extrusion line during the production of the polymer sheet. For example, the in-line lamination of heavy-gauge polymer sheet can be carried out at any location downstream of the extrusion die head 14 and upstream of the location where the heavy-gauge sheet is cut into individual sheets. According to one embodiment, in-line lamination of the heavy-gauge polymer sheet can occur proximate to one or more rollers 16a-c of cooling roller stack 16, while, in another embodiment, the heavy-gauge polymer sheet can be in-line laminated at a location downstream of cooling rollers 16a-c. Specific in-line lamination processes and systems configured according to embodiments of the present invention will be discussed in detail below.

In one embodiment, the polymer modifying film used to laminate the heavy-gauge base sheet can be a pre-formed polymer film. As used herein, the term "pre-formed" means made or formed at an earlier point in time and, in some cases, at a different physical location. In contrast to conventional co-extrusion lamination processes, the pre-formed polymer film can be formed, rolled, and optionally transported and/or stored before being utilized to laminate the heavy-gauge polymer sheet. The pre-formed polymer film can be formed from any suitable polymeric material including those discussed previously with respect to the heavy-gauge polymer base sheet. In addition to the list of materials above, the pre-formed polymer film can be formed from a thermoset or cross-linked polymeric material. Examples of additional suitable polymer materials for use in the pre-formed film can include, but are not limited to, polyester or copolyester, silicone, epoxy, urea formaldehyde, phenol formaldehyde, melamine formaldehyde, and diallyl phthalate (DAP). The pre-formed polymer film and the heavy-gauge polymer sheet can be formed from the same or from different polymeric materials. For example, in one embodiment, the film and the sheet can each comprise a copolyester material, while, in another embodiment, the film and sheet can comprise two dissimilar materials, such as, for example, a copolyester sheet and polyvinyl chloride film.

The pre-formed polymer film can be any film suitable to impart one or more aesthetic and/or functional aspects to the polymer base sheet. In one embodiment, the pre-formed polymer film can be selected from the group consisting of colored films, UV resistant films, weatherable films, anti-microbial films, embossed films, abrasion-resistant films, hard-coat films, printed films, RF/EMI shielding films, low emissivity films, infrared wavelength absorbing or reflecting films, fragranced films, barrier films, metalized or mirrored films, self-cleaning or low-surface energy films (e.g., including those with and without dendritic characteristics), graffiti-resistant films, conductive films, films used as a crack propagation arrest layer, and combinations thereof. In another embodiment, the pre-formed polymer film can be selected from the group consisting of colored films, UV resistant films, antimicrobial films, and combinations thereof.

The pre-formed film can comprise a single layer film (monolayer) or can be formed from two or more film layers bound or otherwise adhered together (multilayer) prior to lamination. In one embodiment, the pre-formed film can also include an optional adhesive layer or a film tie layer to further promote adhesion between the film and the sheet during and after lamination. The pre-formed polymer film can have substantially the same dimensions as the polymer base sheet or can be thinner and/or narrower than the polymer base sheet. In one embodiment, the pre-formed polymer film can have a thickness of at least about 0.05 mils, at least about 0.1 mils, at least about 0.5 mils, or at least about 1 mil and/or not more than about 40 mils, not more than about 20 mils, or not more than 12 mils. According to one embodiment, the ratio of the average thickness of the heavy gauge sheet to the pre-formed film can be at least about 2:1, at least about 4:1, or at least about 6:1 and/or not more than about 500:1, not more than about 100:1, not more than about 50:1, or not more than about 25:1. In one embodiment, the pre-formed film can be narrower than the heavy-gauge sheet such that the pre-formed film can have an total width that is at least about 30 percent, at least about 50 percent, or at least about 60 percent and/or is not more than about 97 percent, not more than about 95 percent, or not more than about 90 percent of the total width of the heavy-gauge polymer sheet. In another embodiment, the pre-formed film can be the same width or wider than the heavy-gauge sheet, such that the total width of the pre-formed film is at least about 100 percent, at least about 110 percent, or at least about 120 percent and/or not more than about 150 percent, not more than about 140 percent, or not more than about 130 percent of the total width of the heavy-gauge polymer sheet.

Referring back to FIG. 1, extrusion system 10 further comprises an in-line lamination system 50, which comprises a film roller 52, an optional directional roller 18, which, in some embodiments, can be a heated roller, and a spreader device 56 over which pre-formed film 22 can pass prior to entering second nip 17b. As pre-formed film 22 passes into second nip 17b, at least a portion of the contact surface 22a of pre-formed film 22 can then come into contact with at least a portion of the contact surface 20a of heavy-gauge polymer sheet 20 at the lamination location to thereby form a polymeric laminate 24. Subsequently, polymeric laminate 24 can then exit second nip 17b, as it is passed along bottom roller 16c, before being routed for further processing and/or storage, as previously described.

During the operation of in-line lamination system 50, it may be desirable to ensure proper co-feeding of pre-formed film 22 into nip 17b to thereby reduce or minimize or eliminate one or more types of defects in the final laminate product. In one embodiment, this can be at least partially accomplished by maintaining a tension on pre-formed film 22 as it is fed into nip 17b of at least about 7 $lb_f$, at least about 9 $lb_f$, or at least about 10 $lb_f$ and/or not more than about 14 $lb_f$, not more than about 13 $lb_f$, or not more than about 12 $lb_f$ on pre-formed film 22, as measured with hand-held tensiometer attached to end of film before starting lamination process. Any suitable device can be used, including, for example, a non-driven roller 52 held in place by a brake mechanism 62, as illustrated in FIG. 3.

In another embodiment, reducing or minimizing the presence of wrinkles and/or ensuring a uniform tension across the entire width of pre-formed polymer film 22 can also help reduce or minimize defects in the resulting polymeric laminate 24. As shown in by one embodiment depicted in FIG. 3, this can be at least partially accomplished by passing pre-formed film 22 over a spreader device 56 prior to being co-fed into nip 17b with heavy-gauge sheet 20. Spreader device 56 can be any fixed or adjustable device operable to maintain uniform tension in the transverse direction across the entire width of pre-formed film 22. Examples of other suitable spreader devices can include, but are not limited to, directed air jets, crowned rollers, angled rollers, rotary clamps, driven or non-driven tractor feed devices and combinations thereof. In addition, wrinkle- or feeding-related defects can also be minimized during start-up by tapering the leading edge of pre-formed polymer film 22 prior to introducing the film into nip 17b. The leading edge of the pre-formed film 22 can be tapered by, for example, cutting the corners of the film as shown by optional cut lines 72a and 72b in FIG. 3. As a result of tapering the leading edge of pre-formed film 22, the film can be more quickly and efficiently introduced into nip 17b during the initial stages of in-line lamination.

In some embodiments, it may be desirable to control the degree of adhesion between the polymer film and heavy-gauge polymer sheet during lamination. In one embodiment, such control can be at least partially affected by adjusting one or more lamination parameters, including, for example, the application of a compressive lamination force, the duration of the application of compressive lamination force, and/or the temperature of the sheet and/or film contact surface at the location at which the compressive lamination force is applied (i.e., the lamination location). In one embodiment, adjusting one or more of these lamination parameters, a suitable "lamination window" can be defined within which a laminate having the desired final properties may be produced. Specific methods of adjusting these lamination parameters according to one or more embodiments of the present invention will now be discussed in detail.

In one embodiment, the degree of adhesion between the heavy-gauge polymer sheet and the pre-formed polymer film can be controlled by adjusting the magnitude and/or method of how the compressive lamination force is applied onto the film and/or sheet at the lamination location. As used herein, the term "compressive lamination force" refers to the force or pressure exerted on the film and/or sheet during lamination, as measured at the respective contact surfaces of the film and/or sheet. According to one embodiment, the compressive lamination force exerted can be at least about 5 pounds per square inch gauge (psig), at least about 15 psig, at least about 25 psig, or at least about 50 psig and/or not more than about 250 psig, not more than about 200 psig, or not more than about 150 psig.

Figures 2A, 2C:
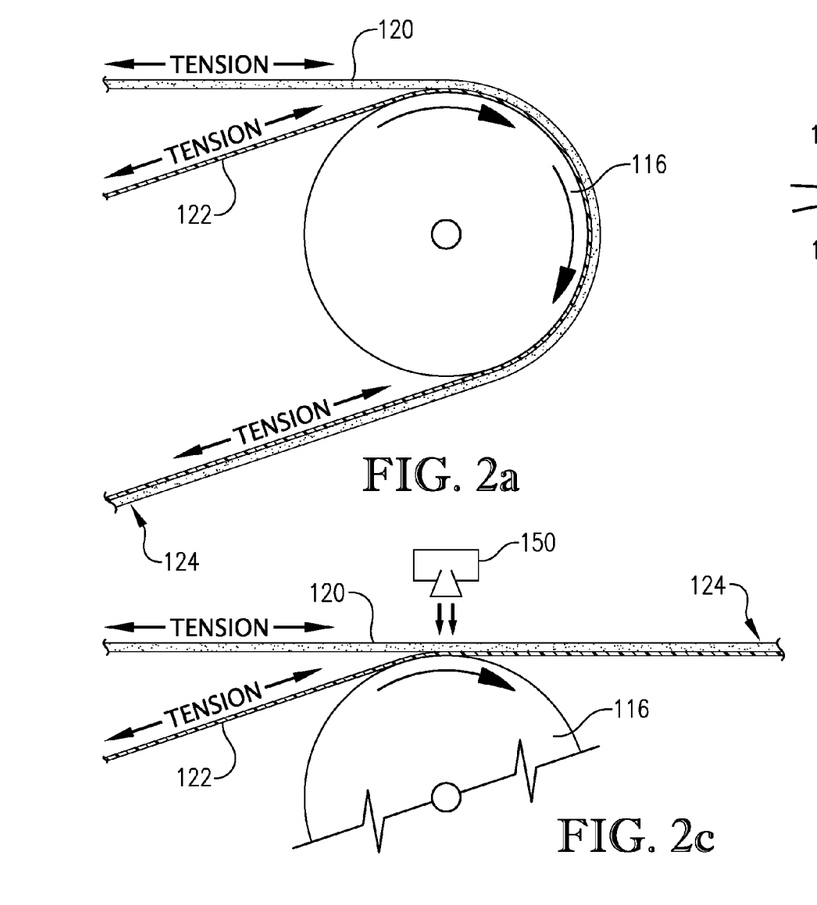
FIG. 2a is a partial schematic side view of a lamination surface used within an extrusion system according to one embodiment of the present invention, particularly illustrating the application of compressive lamination force using tension as the pre-formed film and heavy-gauge sheet are passed over a roller.
FIG. 2c is a partial schematic side view of a lamination surface used within an extrusion system according to yet another embodiment of the present invention, particularly illustrating the application of compressive lamination force using both a pressurized gas and tension as the pre-formed film and heavy-gauge sheet are passed over a roller.
Figure 2B:
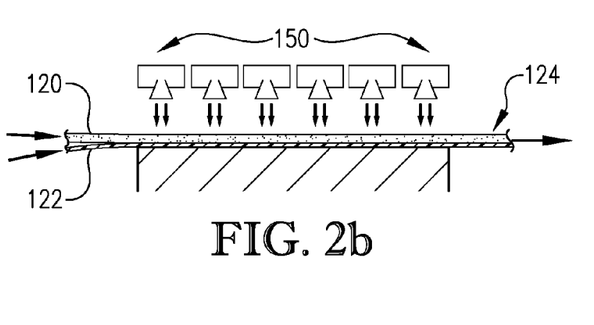
FIG. 2b is a partial schematic side view of a lamination surface used within an extrusion system according to another embodiment of the present invention, particularly illustrating the application of compressive lamination force via a pressurized gas as the pre-formed film and heavy-gauge sheet pass over a flat surface.
Figure 2D:
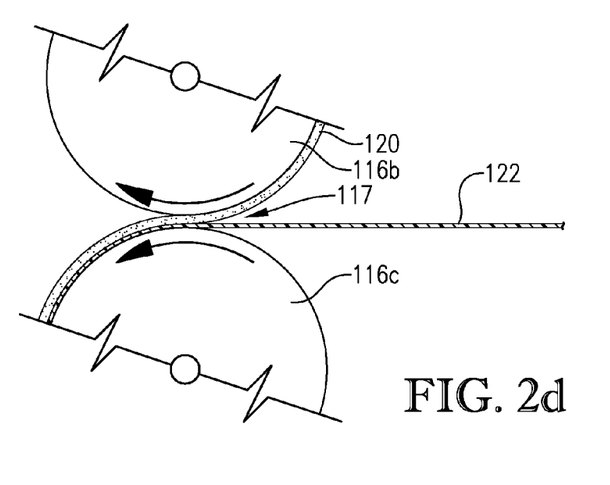
FIG. 2d is a partial schematic side view of a lamination surface used within an extrusion system according to still another embodiment of the present invention, particularly illustrating the application of compressive lamination force by an upper and lower roller as the pre-formed film and heavy-gauge sheet are passed through a nip defined between the rollers.

The compressive lamination force can be applied via film or sheet tension and/or roller or fluid compression and can applied as the heavy-gauge polymer sheet passes over a lamination (or cooling) surface located at some point along the extrusion line. As illustrated in FIGS. 2a and 2c, in one embodiment, at least a portion of the compressive lamination force can be applied using the tension of at least one of the film 122, the sheet 120, and the laminate 124. In another embodiment shown in FIGS. 2b and 2c, at least a portion of the compressive lamination force can be applied using an outside force, such as a pressurized gas (e.g., air) emitted via one or more nozzles 150. In yet another embodiment, shown in FIG. 2d, at least a portion of the compressive lamination force can be applied using a physical item or piece of equipment, such as a roller, at a certain location within the process, as illustrated by nip 117 defined between rollers 116b and 116c. In yet another embodiment (not shown), at least a portion of the compressive lamination force can be applied as the film and sheet are passed through and contacted between a pair of extended upper and a lower compression surfaces, each configured to move in a direction parallel to the direction of movement of the film and sheet. In such an embodiment, the top and bottom surfaces can be operable to exert a generally perpendicularly oriented compression force onto the film and/or sheet to form the resulting laminated sheet. As the lamination force is applied, the pre-formed film and/or heavy-gauge sheet can pass over any suitable type of lamination surface, such as, for example, a roller or other curved lamination surface (as shown in FIGS. 2a, 2c, and 2d) or a substantially flat surface (as shown in FIG. 2b).

The amount of compressive lamination force applied can vary, depending, in part, on the duration of contact between the sheet and the film at the lamination location. According to one embodiment, the compressive lamination force described above can be applied for a lamination period at least about 0.5 seconds, at least about 1 second, or at least about 2 seconds and/or not more than about 30 seconds, not more than about 20 seconds, not more than about 15 seconds, or not more than about 10 seconds. In some embodiments, the compressive lamination force can be applied for at least about 1 minute, at least about 2 minutes, or at least about 5 minutes, depending on the specific method utilized to apply the compressive force and/or the roll diameters. In addition, the duration of lamination can be adjusted depending on the specific lamination temperature, as discussed in detail below.

Lamination temperature refers to the temperature of the film contact surface and/or the sheet contact surface at the lamination location. In one embodiment, the lamination temperature can be maintained such that the temperature of the film or sheet contact surface at the lamination location is at or above the glass transition temperature (ASTM D 3418) of its respective polymeric material. For example, in one embodiment wherein the sheet is formed from a first polymeric material (e.g., a copolyester) and the film is formed from a second polymeric material (e.g., a polycarbonate), the temperature of the sheet contact surface can be at or above the glass transition temperature of the first polymeric material (e.g., the copolyester) and/or the temperature of the film contact surface can be at or above the glass transition temperature of the second polymeric material (e.g., the polycarbonate) when the respective surfaces of the preformed film and the heavy-gauge sheet contact at the lamination location. In other embodiments, both the film and sheet contact surfaces can be at or above the glass transition temperature of the corresponding polymeric material upon contact at the lamination location.

According to one embodiment, the temperature of the contact surface of the sheet and/or the film at the lamination location can be at least about 275° F., at least about 300° F., or at least about 325° F. and/or not more than about 675° F., not more than about 650° F., or not more than about 625° F. In some embodiments of the present invention, the minimum temperature of the sheet contact surface at the lamination location can be at least about 275° F., at least about 300° F., or at least about 325° F. and/or not more than about 430° F., not more than about 425° F., or not more than about 400° F., which is in contrast to conventional (e.g., coextrusion) processes that typically heat the film to a minimum temperature of at least 450° F. As a result of this lower minimum lamination temperature, processes and systems of the present invention can operate within a "wider" lamination window, thereby minimizing costs. In addition, in some embodiments, the availability of lower lamination temperatures may provide wider lamination windows for certain materials, thereby increasing processing flexibility.

Any suitable method can be used to control the temperature of the contact surface of the sheet to within the desired range. For example, in one embodiment, the temperature of the sheet contact surface can be controlled by adjusting one or more extrusion parameters. Examples of extrusion parameters can include, but are not limited to, the extrusion (melt) temperature, the thickness of the polymeric extrudate, the residence time of the polymer sheet on one or more cooling rollers (e.g., wrap angle and/or orientation of rollers in an adjustable stack), temperature of heat exchange fluid passing through one or more cooling rollers, and/or the speed of extrusion of the polymer sheet. By adjusting one or more of these extrusion parameters, the temperature of the heavy-gauge polymer sheet can be increased or decreased as desired.

In another embodiment, the temperature of the contact surface of the heavy-gauge polymer sheet can be increased using one or more in-line heaters, generally illustrated as optional in-line heating device 25 in FIG. 1. In-line heating device 25 can be any suitable heating device employing one or more heat sources. For example, in one embodiment, heating device 25 can utilize an infrared (IR) heat source, a dielectric or microwave heat source, a convective heat source, a conductive heat source, a radiative heat source and/or a reactive heat source. Further, in-line heating device 25 can utilize any suitable type of direct or indirect heat transfer mechanism to preheat the heavy-gauge polymer sheet. Examples of suitable in-line heating devices and methods include, but are not limited to, heated rollers or other items, in-line ovens that heat the sheet via convective heat transfer, in-line heaters that heat the sheet via radiation with IR or microwave energy, use of chemically reactive additives in the sheet that heat the polymer material via an exothermic reaction, and contacting the surface of the sheet with heated liquids (e.g., adhesives), heated gases, or direct flames. Any suitable number or configuration of in-line heating devices can be used in a single extrusion system to in order to achieve the lamination temperatures described above.

In another embodiment, at least a portion of the pre-formed polymer film, which is at approximately ambient temperature prior to lamination, can also be preheated prior to contacting the heavy-gauge sheet at the lamination location. Although it may be desirable to maintain the temperature of the pre-formed film below its glass transition temperature prior to contacting the heavy-gauge sheet, preheating the contact surface of the film to a temperature within about 100° F., within about 50° F., or within about 20° F. of its glass transition temperature may be advantageous in some embodiments. The preformed film can be preheated in a number of ways. In one embodiment, the contact surface of the film can be preheated by maintaining at least about 1 inch, at least about 1.5 inches, or at least about 2 inches and/or not more than about 5 inches, not more than about 4, or not more than about 3.5 inches of wrap along the back side of one of the cooling rollers that defines the contact nip (e.g., cooling roller 16c in FIG. 1) and/or via contact with one or more optional directional rollers (e.g., roller 18 in FIG. 1), which, in some embodiments, can be heated rollers. According to one embodiment, the high-temperature heavy-gauge sheet can also be used to heat the film surface upon contact at the lamination location, as the surface temperature of the film can be at least about 10° F., at least about 25° F., at least about 50° F., at least about 100° F., or at least about 150° F. less than the surface temperature of the sheet. Although the temperature of the film contact surface may be further increased upon contact with the sheet surface at the lamination location, it may be desirable, in some cases, to avoid directly contacting the film and sheet prior to the lamination location in order to minimize operational problems (e.g., sticking) and/or defects of one or both materials.

In one embodiment of the present invention, the degree of adhesion between the heavy-gauge polymer sheet and the pre-formed polymer film can be at least partially controlled through the selection of the polymeric materials from which the film and sheet are constructed. For example, in one embodiment, selecting polymeric materials for the film and the sheet that have a high degree of miscibility with one another can help promote "polymer chain entanglement" at the contact interface between the film and the sheet during lamination. Although not wishing to be bound by theory, it is believed that polymer chain entanglement can occur when molecules of one polymeric material move or diffuse across the film-to-sheet interface into the other polymeric material when each material is at or above its glass transition temperature. Selecting sheet and film materials with a high degree of miscibility can, in some embodiments, enhance the diffusion of one material into the other, thereby strengthening adhesion between the film and the sheet upon solidification. In one embodiment, the polymeric materials selected for the film and sheet can have Hansen Solubility Parameters within about 5 MPa$^{0.5}$, within about 3 MPa$^{0.5}$, or within about 2 MPa$^{0.5}$ of each other. A method for measuring the Hansen Solubility Parameter of a given material can be found in the *Hansen Solubility Parameters in Practice* (*HSPiP*), 3$^{rd}$ ed., (March 2010) retrieved online at hansensolubility.com.

The final polymer laminate produced via extrusion system 10 can have equivalent, or even superior properties, as compared to similar polymer laminates produced via conventional methods, such as co-extrusion. For example, in one embodiment, polymeric laminates produced as described herein can have an adhesive strength, as measured by a 180° Peel Strength test (ASTM D 903), of at least about 5 pounds-force per inch (lb$_f$/in), at least about 10 lb$_f$/in, at least about 15 lb$_f$/in, at least about 20 lb$_f$/in, at least about 25 lb$_f$/in, or at least about 30 lb$_f$/in, wherein 1 lb$_f$/in is equal to 175.13 N/m. In addition, polymeric laminates produced according to embodiments of the present invention can also be operable to mask, hide, or even eliminate various types of aesthetic defects present in the pre-formed polymer film and/or heavy-gauge polymer sheet prior to lamination. For example, in one embodiment, a heavy-gauge sheet having an off-specification color can be in-line laminated with a colored pre-formed polymer film to produce a final polymer laminate of suitable quality. This can be particularly useful when the heavy-gauge polymer sheet includes post-consumer or post-industrial recycled (waste) polymer. In another embodiment, one or more aesthetic defects present in the pre-formed film (e.g., agglomerated pigment or others) can be masked or even nearly eliminated from the final polymer laminate during in-line lamination of the heavy-gauge polymer sheet.

Once removed from extrusion system 10, the laminated polymer sheet produced can be formed or processed into a variety of laminated articles, including, but not limited to, transportation related articles, residential and/or commercial construction-related articles, agricultural-related items, energy-related items, items for industrial and governmental use, signage and exterior paneling. Specific examples of suitable articles include, but are not limited to, street furniture (e.g., bus shelters), ski gondolas, interior components for transportation vehicles (e.g., buses, trains, and cars), skylights, thermoformed integrated bathrooms and related equipment, greenhouse glazings, troughs and other equipment for hydroponic gardening, photovoltaic cells, parabolic mirrors and water heater housings for solar energy collection and use, Fresnel lenses, photo-luminescent signs, exterior wall cladding, protective window sheeting (e.g., hurricane shutters), anti-graffiti panels, golf cart windshields, exhaust fan covers, ceiling fan housings, covers for heavy equipment control panel (e.g., gauges and the like), heavy equipment cab window glazing, marine glazing, tear-off windshields, body panels or windows for cars and other vehicles, ceiling tiles, lighting fixtures, retail point-of-purchase displays, office cubicle wall partitions, acoustic panels and sound walls, bar or desk panels, elevator cabs, sports memorabilia, privacy windows, kiosks, water walls, wall treatments, flooring including tiles and stair/step no-slip tread, handrail panels (balustrade), flexible or rigid wall coverings, including decorative wall panels with optional back lighting, corner guards, columns wraps, and channels, ceiling panels, decorative ceiling pieces, multi-wall or corrugated roof structures, smoke vents, canopies, greenhouses, table tops, chairs, cabinets, door panels, shelves, keyboards, trays, computer stands, chair mats, hot tubs, ballast housing, light switches, exit/emergency signage, HVAC housing, outdoor lighting, microwave housing, appliance panels, window glazing, window blinds, agricultural sheds, trim, molding, dog door, dog house, litter box, feeding dish, dairy kick panels, replacement glass, stove backsplash, tub or shower surround, and the like.

The various aspects of the present invention can be further illustrated and described by the following Examples. It should be understood, however, that these Examples are included merely for purposes of illustration and are not intended to limit the scope of the invention, unless otherwise specifically indicated.

EXAMPLES

Examples 1 and 2 illustrate the effect of sheet thickness and lamination temperature on the adhesion strength of the resulting polymeric laminate. In Example 1, several heavy-gauge copolyester base sheets are in-line laminated with pre-formed copolyester films, while, in Example 2, pre-formed polycarbonate films are in-line laminated to several polycarbonate sheets of varying thickness. Peel strength adhesion tests performed on the resulting laminates indicated that sheets of greater thickness laminated at higher temperatures exhibited greater adhesive strengths than those laminated at lower temperatures.

Figure 6:
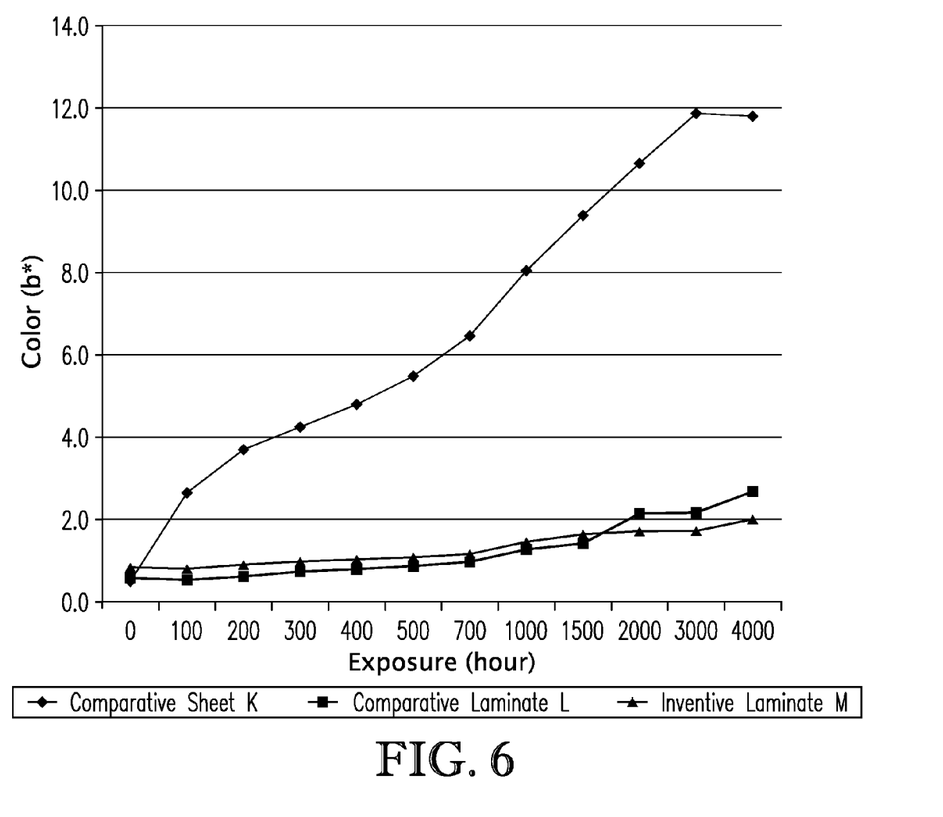
FIG. 6 is a graphical comparison of the weathering ability, expressed in terms of color (b*) as a function of exposure time, of an unprotected copolyester sheet, a UV resistant laminate produced via co-extrusion, and a UV resistant laminate produced via in-line lamination, particularly illustrating the functional equivalency of the co-extruded and in-line laminated products.
Figure 7:
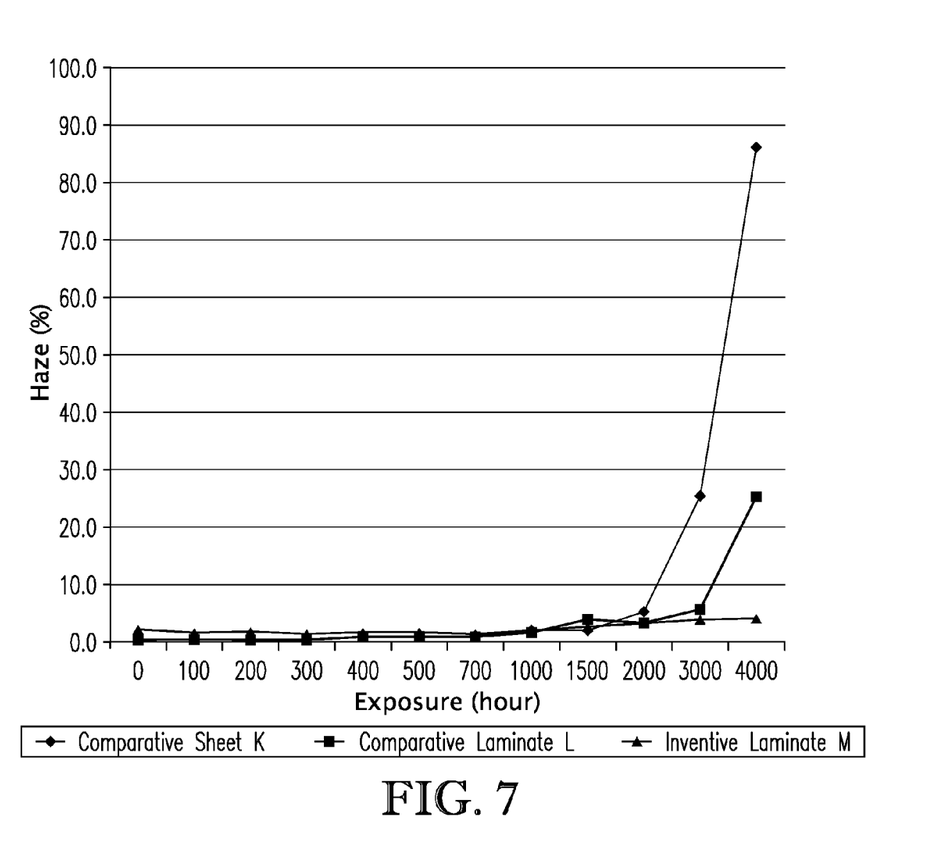
FIG. 7 is a graphical comparison of the weathering ability, expressed in terms of percent haze as a function of time, of an unprotected copolyester sheet, a UV resistant laminate produced via co-extrusion, and a UV resistant laminate produced via in-line lamination, particularly illustrating the functional equivalency of the co-extruded and in-line laminated products.

Example 3 compares the weathering ability of several UV resistant laminates, including a comparative copolyester base sheet functionally modified using a conventional co-extrusion technique and an inventive in-line laminated copolyester base sheet. As shown by the results in FIGS. 6 and 7, the inventively modified base sheet was functionally equivalent, if not superior, to the conventionally-prepared laminate. Prophetic Examples 4 through 9 demonstrate several specific types and uses of the in-line lamination process, including the in-lamination of heavy-gauge sheets with pre-formed modifying films including a colored film, a textured film, a printed film, and a hard coated film.

Example 1

In-Line Lamination of a Copolyester Sheet with a Copolyester Film

A pelletized sample of Spectar™ copolyester resin (commercially available from Eastman Chemical Company) was dried at a temperature of 145° F. for 8 hours. The dried resin was then extruded into a transparent copolyester sheet using a 3.5 inch vented BREYER extrusion line having an L/D of 32:1. The extrusion conditions included a reverse temperature profile with a first zone temperature set point of 475° F. and seventh zone temperature set point of 420° F. The polymer melt exiting the extruder had a temperature of 510° F., as measured by a hand-held DIGI-SENSE thermometer with a K-type thermocouple. The polymer melt was extruded using a 54-inch coat hanger die at a rate of 900 pounds per hour (lb/h). The melt was then passed onto the lowermost roller of a three-roll adjustable upstack, with the third (top) roll set such that a 213° of wrap was achieved around the middle roll.

A series of experimental trials (e.g., Runs A-F) were conducted as generally described above with various sheet thicknesses in order to determine the effect of sheet thickness on both lamination temperature and adhesion strength of the final laminate. During each run, a 0.010-inch thick copolyester film, pre-formed from Spectar™ copolyester resin was co-fed into the second nip of the roller stack between the middle and the upper rollers and configured to contact the hot side of the copolyester sheet. The temperature of the sheet entering the second nip was measured using a CRAFTSMAN Infrared Thermometer (Model No. 50466) and recorded. Multiple laminate samples were obtained for one run before adjusting the sheet thickness for the next experimental trial.

The adhesion strength of laminate samples obtained from each of Runs A through F was then tested using a 180° Peel Strength test, as per ASTM D 903. The laminates, which were formed with a release film between a portion of the film and the sheet to establish a "pre-crack" location for subsequent peel tests were cut into strips measuring 1 inch by 12 inches. Peel strength tests were performed on each sample and utilized an INSTRON Model 5565 Universal Tensile Testing Machine with MTS ReNew interface that utilized a 5 kN load cell and a crosshead traverse speed of 12 inches per minute. The peel strength values for each run, summarized in Table 1 below, are the average of the steady-state peel strength values excluding the initiation peak, except for the samples from Runs E and F, which broke instead of delaminating.

TABLE 1

Effect of Lamination Temperature on Adhesive Strength for PETG Film on PETG Sheet

| Run | Sheet Thickness (in) | Sheet Lamination Temperature (° F.) | Adhesion (lb/in) |
| --- | --- | --- | --- |
| A | 0.091 | 252 | <1 |
| B | 0.110 | 277 | <1 |
| C | 0.130 | 297 | 3.2 |
| D | 0.149 | 306 | 14.3 |
| E | 0.170 | 325 | 30.4 |
| F | 0.191 | 336 | 31.5 |

As shown in Table 1, the experimental runs employing thicker copolyester sheets were able to achieve higher lamination temperatures. Further, these runs that utilized thicker copolyester sheets produced copolyester laminates having higher adhesion than runs that utilized thinner copolyester sheets.

Figure 4:
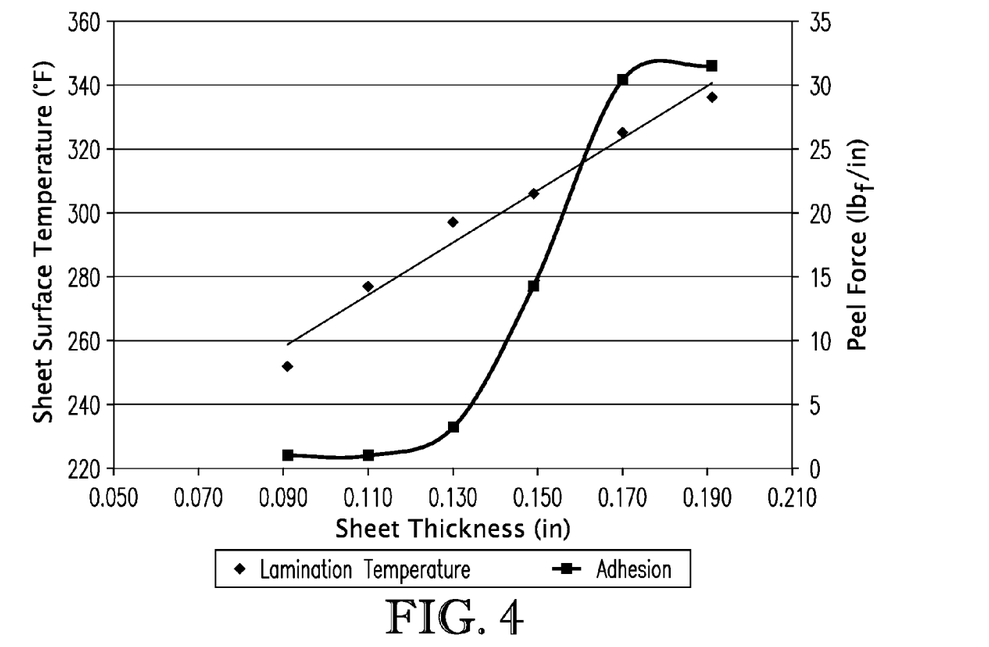
FIG. 4 is a graphical representation of the lamination temperature and adhesive strength of a laminate formed via the in-line lamination of a copolyester sheet with a copolyester film, expressed as a function of the thickness of the copolyester sheet.

FIG. 4 is a graphical summary of the data provided in Table 1. By linearly regressing the lamination temperature versus thickness data (shown as diamonds in FIG. 4) and applying a polynomial fit to the adhesion versus thickness data (shown as squares in FIG. 4), the following equation expressing adhesion (A) as a function of lamination temperature (T) was algebraically derived:

$$A = -398981(T-184.15)/818.17)^4 + 1680368((T-184.15)/818.17)^3 - 318157((T-184.15)/818.17)^2 + 25982((T-184.15)/818.17) - 775.62 \quad \text{(Eq. 1)}$$

Several values for minimum acceptable adhesion strengths were assumed and substituted into the above-derived equation, which was then iteratively solved. The resulting values for minimum predicted lamination temperature and minimum predicted sheet thickness, as a function of minimum adhesion strength, are summarized in Table 2 below.

TABLE 2

Iterative Solutions to Regression Equation (1) for various Adhesion Strengths

| Adhesion Value (lb/in) | Predicted Lamination Temperature (° F.) | Predicted Sheet Thickness (in) |
| --- | --- | --- |
| 5 | 294 | 0.134 |
| 10 | 302 | 0.143 |
| 15 | 307 | 0.150 |

Thus, as shown in Table 2, in order to achieve a minimum adhesion value between 5 and 15 lb/in, the thickness of a copolyester (PETG) base sheet must be approximately 0.134 to 0.150 inches and be in-line laminated at a minimum temperature between 294° F. and 307° F. for the set of extrusion conditions described above.

Example 2

In-Line Lamination of a Polycarbonate Film and a Polycarbonate Sheet

The procedure described in Example 1 was repeated with pellets of Makrolon® 1804 polycarbonate resin (commercially available from Bayer Material Science) with the following differences. The polycarbonate pellets were initially dried at a temperature of 220° F. for 8 hours and the extrusion conditions included a reverse temperature profile with a first zone temperature set point of 550° F. and a seventh zone temperature set point of 525° F., which resulted in a polymer melt temperature of 595° F. The third cooling roller of the adjustable upstack was set to achieve 118° of wrap on the middle roll in order to produce a polycarbonate sheet without curl or sheet stress. Runs G-J were conducted to determine the effect of sheet thickness on laminate temperature and adhesion of the resulting laminate. Adhesion was measured as described previously in Example 1. All samples delaminated; none broke. Results for Runs G-J are summarized in Table 3, below.

TABLE 3

Effect of Lamination Temperature on Adhesive Strength for Polycarbonate Film on Polycarbonate Sheet

| Run | Sheet Thickness (in) | Sheet Lamination Temperature (° F.) | Adhesion (lb/in) |
| --- | --- | --- | --- |
| G | 0.107 | 408 | <1 |
| H | 0.142 | 431 | <1 |
| I | 0.168 | 439 | 5.6 |
| J | 0.188 | 452 | 18.5 |

As shown in Table 3, experimental runs employing thicker polycarbonate sheets achieved higher lamination temperatures. Further, experimental runs utilizing thicker polycarbonate sheets produced laminates having higher adhesion than those utilizing a thinner polycarbonate sheet.

Figure 5:
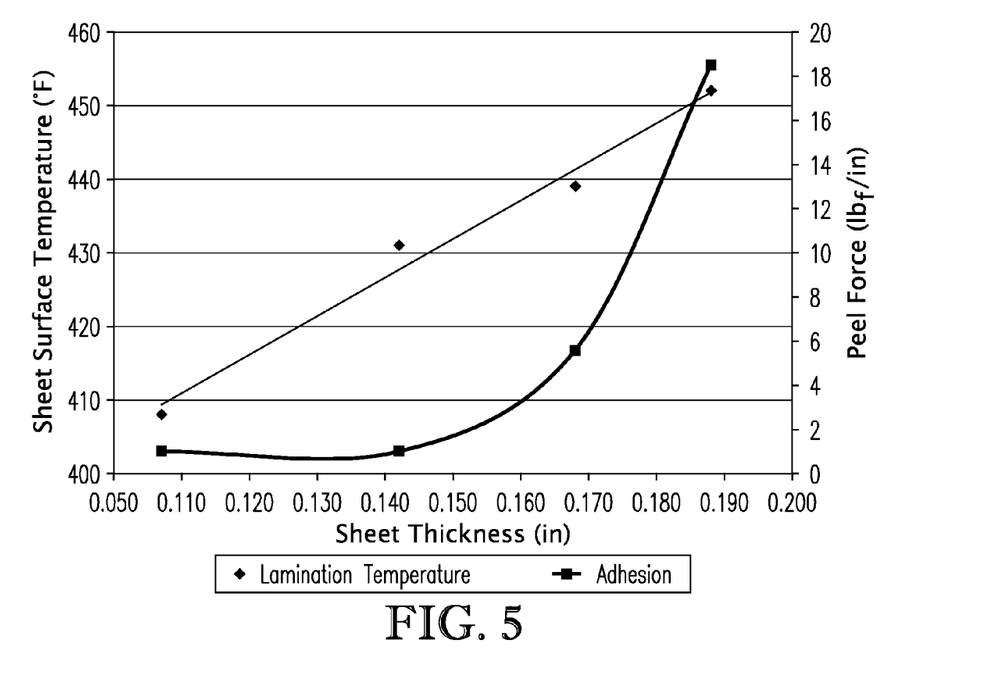
FIG. 5 is a graphical representation of the lamination temperature and adhesive strength of a laminate formed via the in-line lamination of a polycarbonate sheet with a polycarbonate film, expressed as a function of the thickness of the polycarbonate sheet.

FIG. 5 is a graphical summary of the data provided in Table 3. By linearly regressing the lamination temperature versus thickness data (shown as diamonds in FIG. 5) and applying a polynomial fit to the adhesion versus thickness data (shown as squares in FIG. 5), the following equation expressing adhesion (A) as a function of lamination temperature (T) was algebraically derived:

$$A = -89817((T-353.33)/523.44)^3 + 34553((T-353.33)/523.44)^2 - 4399.7((T-353.33)/523.44) - 184.2 \quad \text{(Eq. 2)}$$

Several values for minimum acceptable adhesion strengths were assumed and substituted into the above-derived equation, which was then iteratively solved. The resulting values for minimum predicted lamination temperature and minimum predicted sheet thickness, as a function of minimum adhesion strength, are summarized in Table 4 below.

TABLE 4

Iterative Solutions to Regression Equation (2) for various Adhesion Strengths

| Adhesion Value (lb$_f$/in) | Predicted Lamination Temperature (° F.) | Predicted Sheet Thickness (in) |
|---|---|---|
| 5 | 440 | 0.166 |
| 10 | 446 | 0.177 |
| 15 | 450 | 0.184 |

Thus, as shown in Table 4, in order to achieve a minimum adhesion value between 5 and 15 lb$_f$/in, the thickness of the polycarbonate base sheet, as described herein, must be approximately 0.166 to 0.184 inches and be in-line laminated at a temperature between 440° F. and 450° F. for the set of extrusion conditions described above.

Example 3

Comparison of Weathering Ability of Various UV-Resistant Laminates

Clear Spectar™ copolyester heavy-gauge sheet, having a nominal thickness of 0.190 inches, was extruded as described in Example 1. The resulting base sheet was in-line laminated with a clear 0.005 inch thick film pre-formed from Spectar UV™ resin. The resulting laminate, labeled Inventive Laminate M in Tables 5 and 6, was artificially weathered in a QUV 340 machine (ASTM G 154 Cycle 1) along with an unprotected Spectar™ sheet (Comparative Sheet K) and a Spectar™ sheet with a 3 mil co-extruded cap layer of Spectar UV™ (Comparative Laminate L). The pre-formed film did not delaminate from Inventive Laminate M, which weathered in a similar manner to co-extruded Comparative Laminate L. Results, expressed both in terms of b* color (ASTM D 2244; CIELAB, D65, 10°) and haze (ASTM D 1003), are summarized in Tables 5 and 6, below, and graphically as FIGS. 6 and 7.

TABLE 5

Comparison of Weathering Results for Laminates K-M (b* Color)

| | Color (b*) | | |
|---|---|---|---|
| Exposure time (h) | Comparative Sheet K | Comparative Laminate L | Inventive Laminate M |
| 0 | 0.48 | 0.59 | 0.85 |
| 100 | 2.63 | 0.54 | 0.80 |
| 200 | 3.69 | 0.62 | 0.90 |
| 300 | 4.24 | 0.74 | 0.97 |
| 400 | 4.79 | 0.79 | 1.02 |
| 500 | 5.47 | 0.87 | 1.07 |
| 700 | 6.45 | 0.97 | 1.17 |
| 1000 | 8.03 | 1.26 | 1.45 |
| 1500 | 9.36 | 1.41 | 1.64 |
| 2000 | 10.63 | 2.12 | 1.71 |
| 3000 | 11.84 | 2.16 | 1.71 |
| 4000 | 11.79 | 2.67 | 1.99 |

TABLE 6

Comparison of Weathering Results for Laminates K-M (Haze)

| | Haze (%) | | |
|---|---|---|---|
| Exposure time (h) | Comparative Sheet K | Comparative Laminate L | Inventive Laminate M |
| 0 | 0.14 | 0.38 | 2.22 |
| 100 | 0.18 | 0.65 | 1.74 |
| 200 | 0.22 | 0.35 | 1.82 |
| 300 | 0.47 | 0.52 | 1.46 |
| 400 | 0.94 | 0.87 | 1.70 |
| 500 | 0.92 | 0.94 | 1.86 |
| 700 | 1.44 | 1.19 | 1.53 |
| 1000 | 2.29 | 1.72 | 2.12 |
| 1500 | 2.12 | 3.95 | 2.64 |
| 2000 | 5.24 | 3.38 | 3.16 |
| 3000 | 25.14 | 5.7 | 3.98 |
| 4000 | 86.10 | 25.28 | 4.08 |

As shown by the b* color and haze results in Tables 5 and 6, Inventive Laminate M, formed via in-line lamination of a base sheet with a pre-formed UV resistant film, demonstrated at least functional equivalency (if not superiority) to Comparative Laminate L, formed via co-extrusion, when exposed to UV radiation over a period of 4,000 hours.

Example 4 (Prophetic)

In-Line Lamination of a Sheet with a Colored Film

Clear Spectar™ copolyester heavy-gauge sheet, having a nominal thickness of 0.190 inches, is extruded as described in Example 1. A comparative colored laminate is produced by adding color concentrate to a similar polymer melt processed in a satellite extruder such that a 0.005 inch thick colored layer is co-extruded onto the clear sheet. Upon comparison of the resulting colored laminates, it is determined that the comparative co-extruded color laminate is less desirable than the inventive in-line laminated color laminate, in terms of production efficiency, because the edge trim removed from the co-extruded laminate is also colored. Consequently, the edge trim from the co-extruded laminate is less recyclable and results in additional off-specification product waste. In addition, after the production run is complete, the satellite extruder has to be purged of the color concentrate prior to initiating the next production run, which results in long transition periods and large volumes of off-spec material.

Example 5

In-Line Lamination of a Damaged Film to Mask Defects

Clear Spectar™ copolyester heavy-gauge sheet, having a nominal thickness of 0.190 inches, was extruded as described in Example 1. A black-colored film having a nominal thickness of 0.002 inches and made from Spectar™ copolyester resin was manufactured. The film, which exhibited poor dispersion of black pigment in the polymer base sheet, included several hard, pinpoint defects upon visual inspection (indicating agglomerated pigment). The defective colored film was then in-line laminated to the clear heavy-gauge sheet. Subsequent visual inspection of the resulting laminate showed no sign of pinpoint defects when viewed through the clear sheet. Thus, the in-line lamination of a clear heavy-gauge sheet with a poor quality film can be used to hide pre-existing aesthetic defects present in the film (or even sheet) prior to lamination. Consequently, processes described herein are capable of in-line laminating with low cost, low quality or even off-specification (or waste) film material to form final products of sufficient quality, thereby enhancing flexibility and minimizing cost.

Example 6

In-Line Lamination of a Sheet with a Textured/Embossed Film

Clear Spectar™ copolyester heavy-gauge sheet, having a nominal thickness of 0.190 inches, was extruded as described in Example 1. A textured film made from Spectar™ copolyester, having a thickness of 0.005 inches, was in-line laminated onto the clear heavy-gauge sheet. Although the lamination temperature was high enough to promote desirable adhesion between the film and sheet, the texture was not damaged and was still evident in the final polymeric laminate. Thus, embossing or texturing of a heavy-gauge sheet can be accomplished via in-line lamination without use of capital-intensive embossing equipment or shut down time required to change out an embossing roller.

Example 7 (Prophetic)

In-Line Lamination of a Sheet with a Printed Film

Clear Spectar™ copolyester heavy-gauge sheet, having a nominal thickness of 0.190 inches, is extruded as described in Example 1. A printed film made from Spectar™ copolyester, having a thickness of 0.005 inches, is oriented during in-line lamination such that the image is on the film contact surface. The printed image is visible on the resulting laminate through the transparent sheet, which effectively protects the image printed on the film from subsequent scratching or other damage.

Example 8 (Prophetic)

In-Line Lamination of a Sheet with a Hard-Coated Film

Clear Spectar™ copolyester heavy-gauge sheet, having a nominal thickness of 0.190 inches, is extruded as described in Example 1. A hard-coated film made from Spectar™ copolyester, having a thickness of 0.005 inches, is in-line laminated to the clear heavy-gauge sheet. In contrast to conventional hard coating processes, which include hard coating the entire heavy-gauge polymer sheet, this process is quicker, less expensive, and more efficient.

Example 9

In-Line Lamination of a Copolyester Sheet with Printed PVC Film

Clear Spectar™ copolyester heavy-gauge sheet, having a nominal thickness of 0.190 inches, was extruded as described in Example 1. A film made from polyvinylchloride (PVC) printed with a wood grain pattern and having a thickness of 0.005 inches was in-line laminated to the clear heavy-gauge sheet. Although the film and sheet were made of different types of polymeric materials, adequate adhesion, without the use of an adhesive, was obtained due to the miscibility of Spectar™ copolyester and PVC and the lamination temperature selected.

The preferred forms of the invention described above are to be used as illustration only, and should not be used in a limiting sense to interpret the scope of the present invention. Obvious modifications to the exemplary one embodiment, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

We claim:

1. A process for producing a laminated sheet, said process comprising:
   (a) extruding a first polymeric material through a die head to thereby form a transparent, single layer heavy-gauge polymer sheet having an average thickness of at least 40 mils;
   (b) cooling said heavy-gauge polymer sheet exiting said die head via contact with a cooling roller stack that defines at least one cooling stack nip; and
   (c) co-feeding said heavy-gauge polymer sheet and a pre-formed polymer film formed from a second polymeric material to said cooling stack nip to thereby laminate said pre-formed polymer film onto said heavy-gauge polymer sheet and provide a laminated polymer sheet,
   wherein said pre-formed polymer film has a thickness of not more than 40 mils,
   wherein the heavy-gauge polymer sheet and the pre-formed polymer film are formed from the same polymeric material,
   wherein said pre-formed polymer film has been formed and rolled prior to said co-feeding, and wherein said first and second polymeric materials are both copolyesters.

2. A process for producing a laminated sheet, said process comprising:
   (a) extruding a first polymeric material through a die head to thereby form a single layer heavy-gauge polymer sheet having an average thickness of at least 40 mils,
   wherein said first polymeric material is selected from the group consisting of styrene-acrylic copolymers, styrene-butadiene copolymers and block copolymers, styrene-acrylonitrile copolymers, acrylonitrile-styrene-acrylate copolymers, polystyrene, high-impact polystyrene, transparent acrylonitrile-butadiene-styrene copolymers, copolyesters, polycarbonates, and acrylics;
   (b) maintaining a contact surface of said heavy-gauge polymer sheet at a temperature above the glass transition temperature of said first polymeric material between said die head and a lamination nip defined between a first cooling roller and a second cooling roller; and
   (c) in-line laminating a pre-formed single layer polymer film made from a second polymeric material onto said heavy-gauge polymer sheet at said lamination nip to thereby provide a laminated polymer sheet,
   wherein said pre-formed polymer film has a thickness of not more than 40 mils,
   wherein said second polymeric materials are copolyester materials, wherein said in-line laminating includes co-feeding said pre-formed polymer film into said lamination nip simultaneously with said heavy-gauge polymer sheet, wherein said in-line laminating causes said pre-formed polymer film to adhere to said contact surface of said heavy-gauge polymer sheet, and wherein steps (a) through (c) are carried out at locations along a common extrusion line.

3. A process for producing a laminated polymer sheet, said process comprising:
(a) extruding a first polymeric material from a die located in an extrusion line to form a transparent single layer heavy-gauge polymer sheet having an average thickness of at least 40 mils and a light transmission of at least 80 percent;
(b) passing said heavy-gauge polymer sheet through a nip defined between a first cooling roller and a second cooling roller positioned at another location along said extrusion line; and
(c) co-feeding a pre-formed polymer film formed of a second polymeric material to said nip, wherein said pre-formed polymer film has a thickness of not more than 40 mils, wherein said first and/or second polymeric material is a copolyester, wherein the ratio of said average thickness of said heavy-gauge polymer sheet to the average thickness of said pre-formed polymer film is at least 2:1, wherein said co-feeding includes contacting a contact surface of said pre-formed polymer film with a contact surface of said heavy-gauge polymer sheet to thereby form a laminated polymer sheet, and wherein one of said first and second rollers directly contacts said heavy-gauge sheet at said nip.

4. A process for producing a laminated sheet, said process comprising:
(a) extruding a first polymeric material through a die head to thereby form a transparent, single layer heavy-gauge polymer sheet having an average thickness of at least 40 mils;
(b) cooling said heavy-gauge polymer sheet exiting said die head via contact with a cooling roller stack that defines at least one cooling stack nip; and
(c) co-feeding said heavy-gauge polymer sheet and a pre-formed polymer film formed from a second polymeric material to said cooling stack nip to thereby laminate said pre-formed polymer film onto said heavy-gauge polymer sheet and provide a laminated polymer sheet, wherein said co-feeding of step (c) includes maintaining a tension on said pre-formed polymer film of at least 7 $lb_f$ and not more than 14 $lb_f$, wherein said heavy-gauge polymer sheet exhibits a haze of less than 15 percent, wherein said pre-formed polymer film has been formed and rolled prior to said co-feeding, wherein said pre-formed polymer film has a thickness of not more than 40 mils, wherein said first and/or second polymeric materials are copolyester materials, and wherein said laminated polymer sheet has an average adhesion strength of at least 10 $lb_f$/in.

5. The process of claim 1, wherein said co-feeding comprises contacting a film contact surface of said pre-formed polymer film with a sheet contact surface of said heavy-gauge polymer sheet at a lamination location, wherein the temperature of said sheet contact surface at said lamination location is at or above the glass transition temperature of said first polymeric material and/or the temperature of said film contact surface at said lamination location is at or above the glass transition temperature of said second polymeric material.

6. The process of claim 5, wherein said first and said second polymeric materials have Hansen Solubility Parameter values within 5 $MPa^{0.5}$ of each other.

7. The process of claim 6, wherein the temperature of said sheet contact surface at said lamination location is at or above the glass transition temperature of said first polymeric material and the temperature of said film contact surface at said lamination location is at or above the glass transition temperature of said second polymeric material.

8. The process of claim 1, wherein said co-feeding comprises contacting a film contact surface of said pre-formed polymer film with a sheet contact surface of said heavy-gauge polymer sheet at a lamination location at said cooling stack nip, wherein said sheet contact surface and said film contact surface each have a temperature at said lamination location of at least 275° F. and not more than 675° F., wherein said co-feeding comprises applying a compressive lamination force of at least 2 pounds per square inch gauge (psig) at said laminating location, wherein said lamination force is applied for a lamination time period of not more than 30 seconds.

9. The process of claim 5, wherein at least a portion of said compressive lamination force is applied by two rollers of said cooling roller stack that define said cooling stack nip.

10. The process of claim 1, further comprising, during said co-feeding, maintaining a tension on said pre-formed polymer film of at least 7 pounds-force ($lb_f$) and not more than 14 $lb_f$.

11. The process of claim 1, further comprising heating a contact surface of said pre-formed polymer film from about ambient temperature to a temperature at or above the glass transition temperature of said second polymeric material.

12. The process of claim 1, wherein said cooling roller stack defines at least a first nip and a second nip, wherein said co-feeding comprises co-feeding said heavy-gauge polymer sheet and said pre-formed polymer film into said second nip, and further comprising, subsequent to said extruding of step (a), heating at least a portion of said heavy-gauge polymer sheet prior to feeding said heavy-gauge polymer sheet into said second nip, wherein at least a portion of said heating is carried out using an in-line heat source.

13. The process of claim 1, wherein said pre-formed polymer film is selected from the group consisting of a colored film, a UV resistant film, a weatherable film, an antimicrobial film, an embossed film, an abrasion-resistant film, a hard-coat film, a printed film, a RF/EMI shielding film, a low emissivity film, an infrared wavelength absorbing or reflecting film, a fragranced film, a barrier film, a metalized or mirrored film, a self-cleaning or low-surface energy film, a graffiti-resistant film, a conductive film, films used as a crack propagation arrest layer, and combinations thereof.

14. The process of claim 1, wherein said pre-formed polymer film is selected from the group consisting of a colored film, a UV-resistant film, an antimicrobial film, and combinations thereof.

15. The process of claim 2, 3 or 4 wherein said first polymeric material is selected from the group consisting of polycarbonates, acrylics, copolyesters, and combinations thereof.

16. The process of claim 2, 3 or 4, wherein said first and second polymeric materials are both copolyesters.

17. The process of claim 2, wherein said heavy-gauge polymer sheet has a light transmission of at least 80 percent.

18. The process of claim 2, wherein said in-line laminating of step (c) includes contacting a contact surface of said pre-formed polymer film with said contact surface of said heavy-gauge polymer sheet at said lamination nip wherein the temperature of the film contact surface at said lamination nip is at or above the glass transition temperature of said second polymeric material.

19. The process of claim 18, wherein each of the sheet contact surface and the film contact surface have a temperature at said lamination nip of at least 275° F. and not more than 675° F.

20. The process of claim 2, 3 or 4, wherein said first and second polymeric materials are the same polymeric materials.

21. The process of claim 2, further comprising maintaining a tension of at least 7 $lb_f$ and not more than 14 $lb_f$ on said pre-formed polymer film during at least a portion of said in-line laminating of step (c).

22. The process of claim 2, wherein said pre-formed polymer film comprises a thermoplastic polymer film layer having an average thickness of at least 0.1 mils and not more than 40 mils.

23. The process of claim 2, wherein said pre-formed polymer film is selected from the group consisting of a colored film, a UV resistant film, a weatherable film, an antimicrobial film, an embossed film, an abrasion-resistant film, a hard-coat film, a printed film, a RF/EMI shielding film, a low emissivity film, an infrared wavelength absorbing or reflecting film, a fragranced film, a barrier film, a metalized or mirrored film, a self-cleaning or low-surface energy film, a graffiti-resistant film, a conductive film, films used as a crack propagation arrest layer, and combinations thereof.

24. The process of claim 2, wherein said laminated polymer sheet has an average adhesion strength of at least 10 $lb_f$/in.

25. The process of claim 3, wherein the temperature of the sheet contact surface at said nip is at or above the glass transition temperature of said first polymeric material.

26. The process of claim 25, wherein said pre-formed polymer film is fed to said nip at about ambient temperature, wherein said pre-formed polymer film is heated to a temperature at or above the glass transition temperature of said second polymeric material via contact with said sheet at said nip.

27. The process of claim 3, wherein the minimum temperature of the sheet contact surface at said nip is at least 275° F. and not more than 440° F.

28. The process of claim 3, wherein said first polymeric material is selected from the group consisting of copolyesters, polycarbonates, and acrylics, wherein said pre-formed polymer film comprises a single layer polymer film having a total average thickness of less than 40 mils.

29. The process of claim 3, wherein said first and said second polymeric materials are both copolyesters.

30. The process of claim 3, wherein said co-feeding of step (c) includes maintaining a tension on said pre-formed polymer film of at least 7 $lb_f$ and not more than 14 $lb_f$, wherein co-feeding of step (c) includes passing at least a portion of said pre-formed polymer film over a spreader device prior to said contacting at said nip, wherein said spreader device is selected from the group consisting of a convex spreader bar, directed air jets, crowned rollers, angled rollers, rotary clamps, driven or non-driven tractor feed devices and combinations thereof.

31. The process of claim 3, wherein said pre-formed polymer film is selected from the group consisting of a colored film, a UV resistant film, a weatherable film, an antimicrobial film, an embossed film, an abrasion-resistant film, a hard-coat film, a printed film, a RF/EMI shielding film, a low emissivity film, an infrared wavelength absorbing or reflecting film, a fragranced film, a barrier film, a metalized or mirrored film, a self-cleaning or low-surface energy film, a graffiti-resistant film, a conductive film, films used as a crack propagation arrest layer, and combinations thereof.

32. The process of claim 1, wherein said heavy-gauge polymer sheet exhibits a haze of less than 15 percent.

33. The process according to claim 2, wherein said first polymeric material is selected from the group consisting of copolyesters, polycarbonates, and acrylics.

34. The process according to claim 2, wherein said heavy-gauge polymer sheet is transparent.

35. The process of claim 1, wherein said co-feeding of step (c) includes maintaining a tension on said pre-formed polymer film of at least 7 $lb_f$ and not more than 14 $lb_f$.

36. The process of claim 1, wherein said pre-formed polymer film has a total average thickness of at least 1 mil.

* * * * *